United States Patent
Kato et al.

(10) Patent No.: US 6,589,330 B2
(45) Date of Patent: Jul. 8, 2003

(54) HALOGEN-FREE GREEN PIGMENT COMPOSITION

(75) Inventors: Shigeki Kato, Tokyo (JP); Kosaku Tsuji, Tokyo (JP)

(73) Assignee: TOYO INK Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/025,752

(22) Filed: Dec. 26, 2001

(65) Prior Publication Data

US 2002/0129740 A1 Sep. 19, 2002

(30) Foreign Application Priority Data

Dec. 22, 2000 (JP) ........................................ 2000-390820

(51) Int. Cl.$^7$ ................................................ C09B 67/00
(52) U.S. Cl. .................... 106/413; 106/410; 106/411; 106/493; 106/494; 106/495; 106/496; 106/497; 106/498
(58) Field of Search ................................ 106/410, 493, 106/494, 495, 496, 497, 498, 411, 413

(56) References Cited

U.S. PATENT DOCUMENTS

| | | | |
|---|---|---|---|
| 2,505,744 A | 4/1950 | Scalera et al. | 106/411 |
| 4,710,230 A | 12/1987 | Okoshi et al. | 106/413 |
| 5,112,404 A | 5/1992 | Sommer et al. | 106/506 |
| 5,569,309 A | 10/1996 | Hihara et al. | 8/639 |
| 6,123,763 A | 9/2000 | Kamikubo et al. | 106/506 |
| 6,284,228 B1 | 9/2001 | Markowitz et al. | 424/63 |

FOREIGN PATENT DOCUMENTS

| | | |
|---|---|---|
| DE | 36 23 335 | 1/1988 |
| EP | 0 057 400 | 8/1982 |
| EP | 0 684 290 | 11/1995 |
| EP | 1 022 273 | 7/2000 |
| JP | 1-217078 | 8/1989 |
| JP | 11-173498 | 6/1999 |
| JP | 2000-7974 | 1/2000 |
| JP | 2000-63699 | 2/2000 |
| JP | 2000-253859 A * | 9/2000 |
| WO | WO-00/78873 A1 * | 12/2000 |

OTHER PUBLICATIONS

Patent Abstracts of Japan, JP 11–199796, Jul. 27, 1999.
Patent Abstracts of Japan, JP 2000–007974, Nov. 1, 2000.
Patent Abstracts of Japan, JP 1–217078, Aug. 30, 1989.

* cited by examiner

*Primary Examiner*—Anthony J. Green
(74) *Attorney, Agent, or Firm*—Oblon, Spivak, McClelland, Maier & Neustadt, P.C.

(57) ABSTRACT

Disclosed herein is a green pigment composition comprising (a) a green pigment comprising a mixture of fine particles of a halogen-free blue pigment and fine particles of a halogen-free yellow pigment and (b) a halogen-free pigment derivative. Since the green pigment composition of the present invention does not generate the harmful substances such as dioxin and PCB at the time of burning processing, it is environmentally friendly, sanitary, easily recycled, excellent in light resistance and heat resistance and has the hue of clearness.

9 Claims, No Drawings

HALOGEN-FREE GREEN PIGMENT COMPOSITION

BACKGROUND OF THE INVENTION

1. Field of the Invention

The present invention relates to a novel green pigment composition. Specifically, the present invention relates to a novel green pigment composition that is environmentally safe because any hazardous substance will not be generated upon wasting and/or recycled use, and at the same time has a clear shade and an excellent stability.

2. Description of the Related Art

In recent years, since the environmental pollution has become serious due to the chemical substances, the promotion for solving the problem has been proposed from the viewpoint of the raw materials. Even the coloring materials such as a pigment or the like are not exception for it, the product liability for the safety of the decomposed type and secondary products which generate at the time of wasting and thermal disposal processing for the human body and environments has been examined. There has been a movement in which halide directly causing the generation of PCB and dioxin at the time of burning has to be removed from the raw materials of the products daily used.

The coloring materials of green used as a representative ecological color, at present, in almost all of the cases, are obtained by using chromium oxide green made of an inorganic pigment or cobalt chromium green, chlorination of an organic pigment or, brominated copper phthalocyanine pigment. However, since the former contains chromium, there is a problem upon wasting, the use is limited and in recent years, organic pigments have substituted for it. The latter also contains chlorine and bromine at a high ratio in the chemical structural formula, therefore, for example at the time of burning it, it has a drawback that generates a large quantity of harmful gas. However, at present, especially an organic pigment at an economical cost and having a clarity and an excellent durability which can substitute for phthalocyanine green has not been found yet, therefore, these are at present widely used as the main products for use in green colorants.

However, in recent years, in some fields, a movement intended to use only the materials, which are not the source of causing the generation of hazardous substances, has emerged. For example, as disclosed in Japanese Patent Application Charged-Open No. 2000–7974, there has been also an attempt for manufacturing a green coloring material by dispersing a blue pigment such as phthalocyanine blue or the like and a yellow pigment not containing a halogen atom into the vehicle, separately or at the same time.

However, the manufactured products of green colorants only by mixing a plurality of pigments, these are neither sufficient for endurance nor sufficient for hue being not clarified, only a green coloring material in which the separation of the colors is readily occurred particularly when it is manufactured into an ink or paint has been obtained.

SUMMARY OF THE INVENTION

The present inventors have accomplished the present invention as a result of deliberate studies of systems of green pigment compositions in hopes of solving such problems as mentioned above concerning green colorants. Specifically, having continued to make attempts to let pigment derivative materials cover particles of green pigments obtained by co-wet milling or co-dry milling of halogen-free blue pigments and halogen-free yellow pigments in the presence of milling medium, the present inventors have finally and surprisingly reached a pigment composition that is clear as a colorant and has no color separating tendency, which had not been achieved at all before the invention.

A primary object of the present invention is to provide a green pigment having no practical problems even if considering the safety and sanitary problems and environmental pollution problems while maintaining the clarified shade, an excellent light resistance and excellent heat resistance. Another object of the present invention is to provide a method of manufacturing such a green color pigment composition.

The present invention is a novel green pigment composition comprising (a) a green pigment comprising a mixture of fine particles of a halogen-free blue pigment and fine particles of a halogen-free yellow pigment and (b) a halogen-free pigment derivative.

The green pigment may be a product obtained from a co-fining process of the halogen-free blue pigment and the halogen-free yellow pigment. The pigment derivative contained in the green pigment composition is preferably in an amount of 0.2–30 wt. % based on an amount of the green pigment. The green pigment may be a product obtained by co-wetgrinding the halogen-free blue pigment and the halogen-free yellow pigment. The green pigment may also be a product obtained by co-drymilling the halogen-free blue pigment and the halogen-free yellow pigment.

The blue pigment may be at least one selected from the group consisting of phthalocyanine pigments, threne pigments, and indigo pigments. The yellow pigment may be at least one selected from the group consisting of azo, benzimidazolone, isoindoline, flavanthrone, anthrapyrimidine, anthraquinone, quinolinoquinolone, fluoroflavin and fluoruvin pigments. The pigment derivative preferably has a colorant residue and/or a triazine group.

The present invention is also a pigment dispersion comprising the green pigment composition as above-mentioned and a vehicle component.

In the green pigment composition according to the present invention, the particles of the blue pigment, the particles of the yellow pigment and the pigment derivative may be in a state of homogeneous mixture in their particle size order. Also in the green pigment composition according to the present invention, average particle sizes of primary particles constituting the blue pigment and the yellow pigment are preferably both 0.1 micron or less.

In general, pigment dispersion is a fine particle dispersion system in which each fine-size primary particle is in itself an assembly of crystallites of pigment molecules and in turn each pigment aggregate dispersed is one made of a plurality of such primary particles. In order to realize, by color mixing, a high quality green pigment composition not resulting in color separation or sedimentation, it is considered that it is essential to uniformly disperse, at their particle level of fineness, different kinds of pigment particles and secure the stability. The present inventors have considered that it may be difficult, when considering the circumstance confronted, a system composed of fine particles and where strong interfacial effect is present therefore, to attain such a desired state in the system, solely by means of the simple mixing processes of particles conventionally conducted.

A pigment immediately after being synthesized is typically composed of large particles having a size of 10 micron or more. Such a large particle is made to be fined in the subsequent pigmentation process. The fining process can be recognized as a process in which specific surface area of each pigment particle increases and the number of unstable surface molecules also increases, accordingly. Due to the existence of an extremely large number of such surface molecules, the pigment particles fined are temporarily put under an unusual condition that is thermodynamically extremely unstable and has high energy. Therefore when pigment particles of the same type, which have the same molecular structure and crystal structure and have thus an extremely high affinity each other, are once placed in a state of being finely divided and mixed, the particles tend to readily and rapidly agglomerate each other to realize an energetically stable state. In a pigment system where it has been realized based on a color mixing effect, such affinities between particles of the same kind will compete with those between particles of different kinds, and will work, as a result, to deprive of them the opportunity for mutually coming close to (or further intimately contacting) and homogeneously mixing with each other. The present inventors have considered that the consequence was just the green pigments that have been conventionally obtained and of low qualities where, for example, color separation and sedimentation easily proceed and also in a passage of time degradation proceeds rapidly further.

In the present invention, in order to appropriately cut off the agglomeration between particles of the same type, give the opportunity of closer approximations between pigment particles of different types and give them the stability in a mixed state, a specific substance, which is what we call "pigment derivative", is used. "Pigment derivative" used herein is considered a substance, a chemical compound, which has an affinity to at least one of the blue pigment and the yellow pigment used, has a color development characteristic which is not problematic with the normal color development of the pigment used (or substantially being colorless), and still further, does not have a halogen atom in the molecular structure. "Pigment derivative" is considered as such an element as described above if it will be understood from its functions. It is further desirable that it has an excellent affinity for vehicle component used upon preparing an ink. As one example of such a "pigment derivative", a substitution product substituted by substituents having an excellent affinity for an ink vehicle component typically used of the pigment skeleton of at lease one of the blue pigment or yellow pigment used, for example, sulfonic acid group, sulfoamide group, aminomethyl group, phthalimidemethyl group is considered.

As already described, the same kind of pigment particles already fined has a tendency of reciprocally and swiftly agglomerating each other when particularly inclusion such as a binder resin or the like does not exist. Therefore, it is appropriate that an introduction of "pigment derivative" used in the present invention to the system of the relevant pigment is performed prior to the point in time when the opportunity of such agglomerates of the same kinds of particles are proceeded or at least on the way of its proceeding. In other words, after the agglomerate of the same kinds of particles is sufficiently proceeded, even if a "pigment derivative" is further added at least as it is and mixed, it will be, in general, difficult to obtain a pigment composition of the present invention. In order to hinder the agglomerate occurred between the similar kinds of pigment particles, it is effective to perform the fining process en bloc in a mixture state without performing the fining of each pigment (pigmentation) separately and then mixing both.

A green pigment composition of the present invention can be realized via appropriate preparation processes. Once the "pigment derivative" is incorporated into a pigment dispersion system as intended, the stability of the energy state of the system is realized, at this time, the direct agglomerate of the same type of pigment particles is hindered, the stable color mixture state will be realized and maintained.

As indicated below, the present inventors have obtained the identical positive results, however it is limited, at any case, on the basis of a variety of concrete material selection; that is a proof of validity as the technological concept of the present invention.

A green pigment composition of the present invention may be manufactured by complexing it in the step of fining the blue pigment and the yellow pigment, and then passing through the process of adding a pigment derivative to the obtained green pigment. In the pigment composition manufactured via these processes, its pigment particle is in a state of being covered with the relevant pigment derivative. Due to such a microscopic surfactant environment, a pigment composition according to the present invention indicates a significantly enhanced clearness, color strength and the stability of the dispersion comparing to the conventional green pigment composition without adding the pigment derivative. Particularly, in the case where a pigment derivative having the same pigment skeleton with the pigment used, the effect to be aimed at by a composition of the present invention is significantly obtained.

A green pigment composition of the present invention is different from the green colorants color-matched by simple color mixture at the time of conventional manufacturing of an ink and manufacturing of coating material. Specifically, a green pigment composition of the present invention is good at stability in storage, whose hue is clarified, whose high light resistance and high heat resistance are maintained, and since at the same time, a halogen atom is not contained in the composition at all, it is a safe, sanitary pigment composition having a good quality, not containing the environmental problems and not generating a hazardous chemical substance at the time of burning.

DETAILED DESCRIPTION OF THE INVENTION

As a result of eagerly studying, the present inventors have found being capable of providing a color material maintaining the similar coloring as the coloring material using a poly-halogenated (chlorinated or brominated) phthalocyanine and still stable colorants by using in combination a blue pigment not containing a halogen atom and a yellow pigment not containing a halogen atom obtained by co-wet milling, and achieved the present invention. As a blue pigment used in the present invention, there is not any particular limitation if it is a blue organic pigment not containing a halogen atom, it can be used by defining the quality level by the color shade to be aimed at and by referring to the durability and economy required. Following are some of examples of blue pigments that may be used in the present invention, being indicated by their color index numbers (C.I. No.): C.I. PIGMENT BLUE 15, C.I. PIGMENT BLUE 15:2, C.I. PIGMENT BLUE 15:3, C.I. PIGMENT BLUE 15:4, C.I. PIGMENT BLUE 15:5, C.I. PIGMENT BLUE 15:6, C.I. PIGMENT BLUE 16, C.I. PIGMENT BLUE 60, C.I. PIGMENT BLUE 64, and C.I. PIGMENT BLUE 66.

As for phthalocyanine pigments, those having Cu as a central metal element are typically used as blue pigments, although others that have Ni, Co, Fe, Si, Al or the like as a central metal element, or of metal-free type, also may be used. Depending on the color shade to be aimed at, various crystal types such as α-type, β-type, ε-type or the like may be used. However, copper phthalocyanine is preferable if one stands on an economical viewpoint.

Regarding yellow pigments, as long as it is a yellow organic pigment not containing a halogen atom, basically any of them may be used. However, in order to give an excellent light resistance and excellent heat resistance, the pigment not containing a halogen atom in the structure of benzimidazolone pigments, isoindoline pigments, flavanthrone pigments, anthraquinone pigments, quinolinoquinolone pigments, fluoroflavin pigments and fluoruvin pigments is preferable. The combination selected from the above-described pigment group may be used. Hereinafter, examples of yellow pigments, which may be used in the present invention, are indicated by the color index (C. I. No.) and general name. However, the present invention is not limited to these.

These are C. I. Pigment Yellow 1, 4, 5, 9, 24, 42, 65, 61, 62, 74, 100, 101, 104, 117, 120, 123, 129, 133, 139, 147, 148, 151, 155, 168, 169, 175, 180, 181, 182, 185, 192, 194 and 213, or quinolinoquinolone, dimethyl quinolinoquinolone, fluoflavin, dimethylfluoflavin and fluoruvin.

The pigment immediately after the synthesis is referred to as a crude pigment in almost all of the cases, which is a form not suitable for colorants and having a size. A crude pigment is typically fined and selected in a particle size in the additional treatment step called as pigmentation, processed into the most suitable size as a color material, and used for an ink and paint. For example, the size of the primary particle of copper phthalocyanine pigment used as a color material is less than 0.1 micron, whereas a crude copper phthalocyanine pigment obtained by the synthesis is a gigantic particle on the order of 10 to 200 microns. The size of it has to be controlled to a size practical as a color material on the order of 0.02 to 0.1 micron by performing a treatment called as pigmentation. In a method of manufacturing a green pigment composition indicated herein, a low cost, crude pigment which has not been pigmented is used as a starting material, via processing steps such as wet-milling, dry-milling or the like, then a green pigment is obtained. Since it is a procedure for realizing a color mixture pigment system starting from a crude pigment, for example, as described in Japanese Patent Application Charged-Open No.2000–7974, the relevant procedure is far more advantageous in its economy when comparing to the procedures of manufacturing a color mixture pigment system starting from a pigment commercially available, and a dispersion having more excellent suitability is obtained.

The blending ration of a blue pigment and a yellow pigment when a green pigment is manufactured can be adjusted depending upon the green shade to be aimed at. The range of the blue pigment: yellow pigment =90:10 to 10:90 is preferable and then desirably, in the range of 70:30 to 20:80.

In a method of preparing a green pigment of the present invention, a mixture in which a blue pigment powder and a yellow pigment powder has been previously mixed may be used. When charging into a wet milling equipment or a dry-milling equipment, the blue pigment and yellow pigment may be charged individually so that they are in the designated ratio.

As a method of wet-milling, concretely, a small amount of aqueous solvent is added as a lubricant to the mixture of the blue pigment, yellow pigment and an aqueous inorganic salt at the above-described blending ratio, strongly and mechanically kneaded and ground by grinder such as a kneader or the like into a fined pigment, and then the aqueous inorganic salt and aqueous solvent may be removed. The weight ratio of the aqueous inorganic salt to the pigment is in the range of 2 to 20:1, and more preferably in the range of 3 to 10:1. The weight ratio of the aqueous solvent to the pigment is in the range of 0.5 to 3:1, and more preferably in the range of 0.7 to 2. For the removal of the aqueous inorganic salt and aqueous solvent, after the kneaded mixture is put into water, agitated and made it into a slurry shape, filtrations and washings are repeated.

Examples of aqueous inorganic salts include sodium chloride, potassium chloride and sodium sulfate. Examples of aqueous solvents include 2-methoxy ethanol, 2-butoxyethanol, 2-(isopentyloxy) ethanol, 2-(hexyloxy) ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether and liquid polypropylene glycol.

The desirable temperature when wet-milling is, although it also depends upon the kinds of pigments used and blending ratio, typically in the range of 40 to 130° C., and more preferably in the range of 60 to 120° C. The wet-milling time depends upon the kinds of pigments, blending ratio and the green shade to be aimed at, however, usually may be in the range of 1 to 12 hours. The additional ratio of solvent, grinding material or the like and the grinding temperature are preferably adjusted so that the hue to be aimed at is obtained in the range of these. After completing the pigment mass grinded and ink milled is re-slurried in a large amount of water, depending upon the cases, heating is performed, after uniformed slurry is made, the grinding material and grinding solvent may be completely removed by performing filtrations and washings, and depending upon the cases, washing by the solvent such as methanol or the like. A wet cake of the green pigment composition to be aimed at may be obtained by passing through these processes.

In the case where a pigment is prepared by dry-milling, the known dry-milling equipment such as an attritor, a ball mill, a vibrating mill or the like may be used. The green pigment composition having the color shade to be aimed at may be obtained by performing the processing such as pigmentation and emulsion treatment to the green pigment grinded and obtained and selecting the particle size if it is necessary.

The term "pigment derivative" in the present invention means a compound consisted of an organic dye, a pigment or its precursor not containing a halogen atom. The term "dye" is referred to a pigment soluble in water or oil, and the term "pigment" is referred to a pigment substantially insoluble in water and oil.

The pigment derivative may have a structure represented by the following general formula. The structure may be selected while considering the effect on a vehicle component used and the color balance to the green pigment.

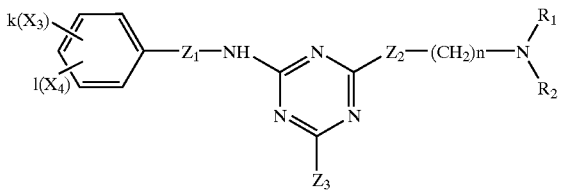

Q represents an organic pigment residue that does not contain a halogen atom. $X_1$ and $X_2$ are different from each other, and a hydrogen atom or a substituent indicated as follows; i and j independently represent an integer of 1 to 4, respectively.

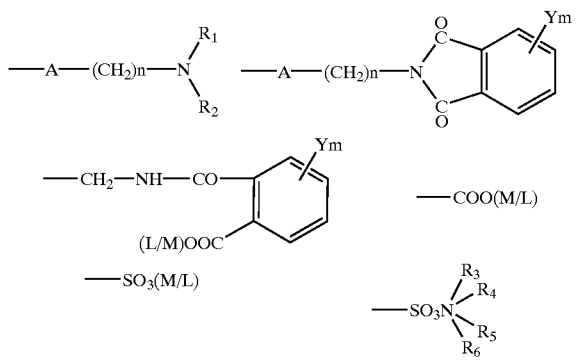

$R_1$, $R_2$ represent a hydrogen atom, an alkyl group having 1 to 4 carbon atoms, respectively and independently. Or, $R_1$ and $R_2$ together may constitute a 5 or 6 member ring structure which may further contain N, O or S atom. $R_3$, $R_4$, $R_5$ and $R_6$ are a hydrogen atom, or an alkyl group having 1 to 30 carbon atoms. However, all of $R_3$, $R_4$, $R_5$, and $R_6$ are not to be hydrogen atoms. Y represents a hydrogen atom, —$NO_2$, —$NH_2$ or —$SO_3H$. M represents a hydrogen atom or divalent or trivalent metal atom, m represents an integer of 0 to 4, L represents valence number of M, and n represents an integer of 1 to 8.

A represents direct bonding, —O—, —S—, —CO—, —$SO_2$—, —$CH_2NHCOCH_2$—, —$CR_7R_8$—, —$SO_2NR_7$—, —$CH_2NHCO$—, —$CH_2NCONR_7$— ($R_7$ is an hydrogen atom, an alkyl group having 1 to 30 carbon atoms or an aryl group, $R_8$ represents an alkyl group having 1 to 30 carbon atoms or an aryl group), or a divalent linkage group indicated by the following formula:

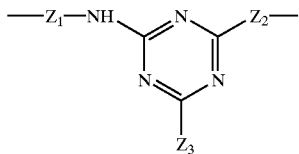

$Z_1$ represents direct bonding, —CONH—$R_9$—, —$SO_2NH$—$R_9$—, or —$CH_2NHCOCH_2$—$R_9$— wherein $R_9$ represents an alkylene group having 1 to 8 carbon atoms or an arylene group. $Z_2$ represents —NH— or —O—. $Z_3$ represents a hydroxide group, an alkoxy group or a substituent indicated by the following general formula:

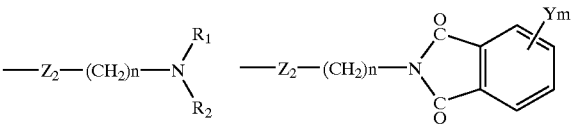

In the formula, each of $R_1$, $R_2$, $Z_2$, n and Ym is as already described above. In the case where i represents 1, $Z_3$ may represent —NH—$Z_1$—Q.

$X_3$ represents an amino group, $X_4$ represents a hydrogen atom, an amino group, a nitro group, a hydroxide group, an alkoxy group, a carboxyl group, a sulfonic group, an alkyl group which may be substituted or not be substituted, or an alkenyl group which may be substituted or not be substituted. k represents an integer of 1 to 3, 1 represents an integer of 0 to 2.

Aryl group herein means a phenyl group or a naphthalene group, which may be substituted by an alkyl group or not be substituted. Arylene group herein means phenylene group or naphthalene group, which may be substituted by an alkyl group or not be substituted.

Preferable examples of an organic pigment residue Q include halogen-free colorant residues of phthalocyanine-type, threne-type, indigo-type, benzimidazolone-type, isoindoline-type, flavanthrone-type, anthrapyrimidine-type, anthraquinone-type, quinolinoquinolone-type, fluoroflavin-type, fluoruvin-type, diketopyrrolopyrrole-type, quinacridone-type, perylene-type, perinone-type and types of metal complex. Furthermore, pale yellow aromatic ring compounds such as those of naphthalene-type or anthraquinone-type, which generally may not be called a colorant, are also included.

These pigment derivatives may be synthesized by known methods such as those described in, for instance, Japanese Patent Application Published No. S39-28884, Japanese Patent Application Charged-Open No.S58-28303, Japanese Patent Application Charged-Open No.1-217078, Japanese Patent Application Published No.3-14073, or Japanese Patent Application Charged-Open No.11-199796 and the like. The pigment derivative preferably has a hue not changing or having less influence on the shade the green pigment used has originally produced. The pigment derivative is preferably a compound having the same colorant skeleton as that of the green pigment itself used. It is preferably colorless or pale yellow.

For a method of adding a pigment derivative, although the pigment derivative in a dried powder form may be added during the dispersion process of the green pigment, the pigment derivative may be used by previously mixing with the green pigment, preferably, it is added at the time when the pigment is sufficiently fined during wet-grinding or dry-milling, so that the particles of the green pigment are co-present and covered with the derivative material. Nonetheless, the method is not strictly limited to a certain one.

The preferable amount of addition of the pigment derivative is in the range of 0.2 to 30 wt. % with respect to the green pigment, and determined by the particle diameter, structure of the green pigment, the structure of the pigment derivative and further the vehicle composition used. It is preferable that the amount of addition is lesser, so long as the effect is suitably obtained, and it is more preferable that the amount is optimized in the range of 1 to 15 wt. %.

It is presumed that the added pigment derivative exerts to adsorb on the surfaces of fine particles of the green pigment present, prevent the separation between blue pigment particles and yellow pigment particles which constitute the green pigment, provide resin-adsorbing layers to pigment particles at the time when it is in a dispersion medium, and enhance the dispersion stability. Therefore, it is important to select a pigment derivative having a color skeleton. In order to promote the resin absorption, the affinity between the terminal structure of the pigment derivative and the vehicle for forming the dispersion is also important. From these viewpoints, it is desirable that the most suitable pigment derivative is selected.

In the step of wet-milling or dry-milling, other additives may be added in the range not inhibiting the object of the present invention. The resins may be used in combination in order to prevent a strong agglomeration which will occur at the time of drying the fined green pigment, and easily enable to disperse it into transparent resin or the like. The resins may be used in combination during the pigmentation of the present invention, thereby probably resulting in obtaining a softer fine particle comparing to this. As a resin used, it is preferable solid at room temperature and insoluble in water. Examples of resins include a natural resin, a modified natural resin, a synthesized resin, and a synthesized resin modified by a natural resin. For a natural resin, rosin is typically used. Examples of modified natural resins include a rosin derivative, a fibrous cellulose derivative, a rubber derivative, a protein derivative and oligomers thereof. Examples of synthesized resins include epoxy resin, acryl resin, maleic resin, butyral resin, polyester resin, melamine resin, phenol resin, polyurethane resin, and polyamide resin. Examples of the synthesized resins modified by a natural resin include a rosin-modified maleic resin and a rosin-modified phenolic resin. The usage amount of the resin is preferably in the range of 5 to 100 wt % with respect to the green pigment.

Furthermore, in the processing step, additives such as a pigment dispersing agent, a plasticizer or inorganic pigments such as calcium carbonate, barium sulfate, silica or the like except for the resins may be used in combination.

A vehicle component used for a pigment dispersion may be a vehicle for an offset ink, a vehicle for a gravure ink, a vehicle for a paint, a vehicle for a printed circuit board ink, a vehicle for a resist ink for a color filter, a vehicle for an ink jet, a resin for a toner, or a resin for a molded plastic.

A vehicle for an offset ink may be a vehicle in which a resin such as a rosin-modified phenolic resin, a rosin-modified maleic resin, a petroleum resin, an alkyd resin or the like is combined with soybean oil, tung oil, linseed oil as main components.

A vehicle for a photogravure ink may be a vehicle in which a resin such as a lime rosin resin, a polyamide resin, a vinyl chloride resin, a cyclized rubber, a urethane resin, an acryl resin, a maleic resin, a nitrocellulose is combined with a solvent such as an aliphalic hydrocarbon, an aromatic hydrocarbon, a halogenation hydrocarbon, an alcohol, a ketone, an ester, an ether, an ether-alcohol, an ether-ester and water as main components.

A vehicle for a paint may be a vehicle in which a resin such as a nitrocellulose lacquer, an aminoakyd resin, an acryl lacquer an aminoacryl resin, a urethane resin, polyvinylacetal resin, an epoxy resin, a polyester resin, a vinyl chloride resin, a vinylidene fluoride resin, a polyether sulfone resin is combined with a solvent such as an aliphatic hydrocarbon, an aromatic hydrocarbon, a halogenation hydrocarbon, an alcohol, a ketone, an ester, an ether, an ether-alcohol, an ether-ester and water as main components.

An ink vehicle for a printed circuit board may be a vehicle in which an unsaturated group containing a resin such as a polycarboxylic resin, a bisphenol A type epoxy compound, an ultraviolet ray hardening resin or thermal hardening resin is combined with a polymerization initiation agent and a solvent such as a ketone, an ester, an ether, an aliphatic hydrocarbon and an aromatic hydrocarbon as main components.

An ink vehicle for a resist ink for a color filter will be described as follows: Examples of thermal hardening resins and thermal plastic resins include a butyral resin, styrene-maleate copolymer, a vinyl polyacetate, a polyurethane based resin, a phenol resin, a polyester resin, an acryl based resin, an epoxy resin, celluloses and a urea resin. Photosensitive resins may contain a photocrosslinking group such as (metha) acryl compound, cinnamic acid is introduced via an isocyanate group, an aldehyde group, an epoxy group or the like into a linear polymer having a reactive substituent such as a hydroxyl group, a carboxyl group, an amino group and the like. A monomer, an oligomer or the like for forming a similar coating film with a resin by being hardened with radiation irradiation may be used. The ink vehicle may contain a photo-initiator, sensitizer, and solvent. Examples of such solvents include an aliphatic hydrocarbon, an aromatic hydrocarbon, a halogenation hydrocarbon, an alcohol, a ketone, an ester, an ether, an ether-alcohol, or an ether-ester solvents such as cyclohexanone, cellosolve acetate, diethylene glycol dimethylether, ethylbenzene, ethylene glycol diethyl ether, xylene, methylethyl ketone, and ethyl acetate.

An ink for printing, a coloring resist or the like is finally produced by performing the removal of large particles and/or contained dust which may be more than 5 $\mu$m in size, preferably more than 1 $\mu$m, more preferably more than 0.5 $\mu$m, by means of a centrifuge, a sintering filter, membrane filter or the like.

As a vehicle for ink jet printing inks, a resin soluble in water such as an acryl resin, a styrene-acryl resin, a polyester resin, a polyamide resin, a polyurethane resin and a fluororesin, or an emulsion having dispersibility or colloidal dispersion resin may be used. A neutralizing agent such as ammonia, amine, inorganic alkali or the like is added to these resins according to the necessity. Examples of solvents used include water, ethylene glycol, polyethylene glycol, ethylene glycol monomethyl ether and substituted pyrrolidone. Alcohols such as methanol, ethanol, isopropyl alcohol and the like may be used for the purpose of accelerating the dryness after printing. Furthermore, an anion activating agent, a non-ion activating agent, a cation activating agent or an amphoteric ion activation agent may be used for enhancing the dispersing stability of an antiseptic agent, a penetrant, a chelate agent and a pigment.

Examples of resins for toners include polystyrene, a styrene-acryl copolymer, a chloride resin, a styrene-vinyl acetate copolymer, a rosin-modified maleic resin, a phenolic resin, an epoxy resin, a polyester resin, a low molecular polyethylene, a low molecular polypropylene, an ionomer resin, a polyurethane resin, a silicone resin, rosin ester and rosin.

Examples of resins for a molding plastic include polyolefin based resin such as polypropylene, polyethylene, an ethylene-propylene copolymer, a copolymer of $\alpha$-olefin and acrylic acid or maleic acid, an ethylene-vinyl acetate copolymer, a copolymer of ethylene and acrylic acid or maleic anhyride, a vinyl resin such as polyvinyl chloride and polyvinyl acetate, acetal resin such as formyl resin and butyral resin, acryl resin such as polyacrylonitrile and a methacryl resin, a styrol resin such as polystylene and acrylonitrile-butadiene-stylene copolymer, a polyester resin such as polyethylene terephthalate and polycarbonate, a nylon such as 6-nylon, an unsaturated polyester resin, an epoxy resin, a urea resin, a melamine resin, and a cellulose resin.

Furthermore, as a resin for the above-described variety of vehicles, a biogradable raw material such as starch-modified resin, cellulose/chitosan, polyhydroxy butyric acid, polycaprolactone, polylactic acid may be used.

EXAMPLES

Hereinafter, the present invention will be described further in detail with reference to examples, although the invention should not be considered limitatively only to the examples. In the examples and comparative examples, part represents part by weight, and % represents wt. % (% by weight). Diameters of primary particles of each pigment were observed by a transmission electron microscope and evaluated.

Among the pigment derivatives used in the examples, those that are complex in terms of their molecular structures are shown in detail in Table 1 and Table 2.

TABLE 1

A 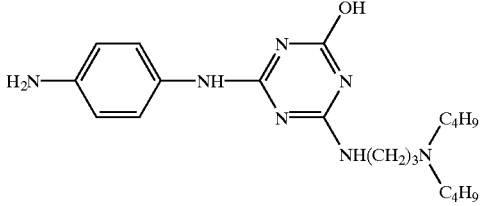 Colorless

B 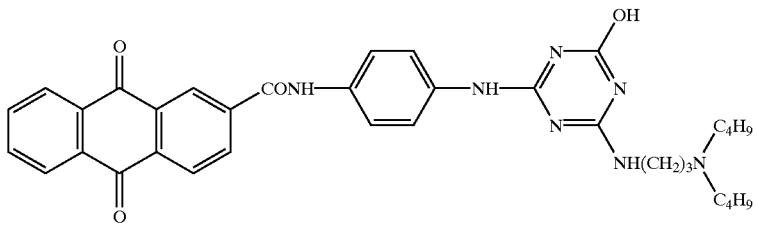 Pale yellow

C 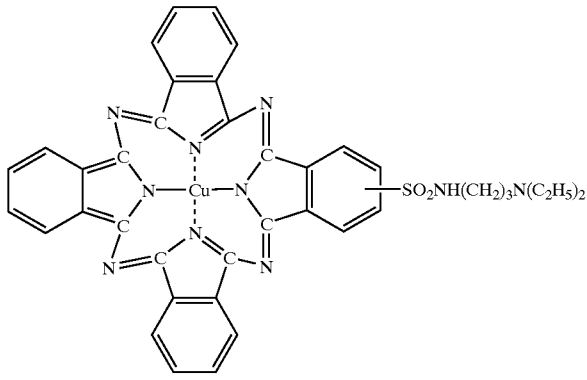 Blue

D 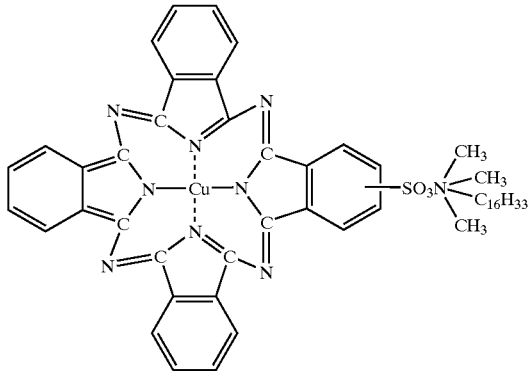 Greenish blue

TABLE 1-continued
E 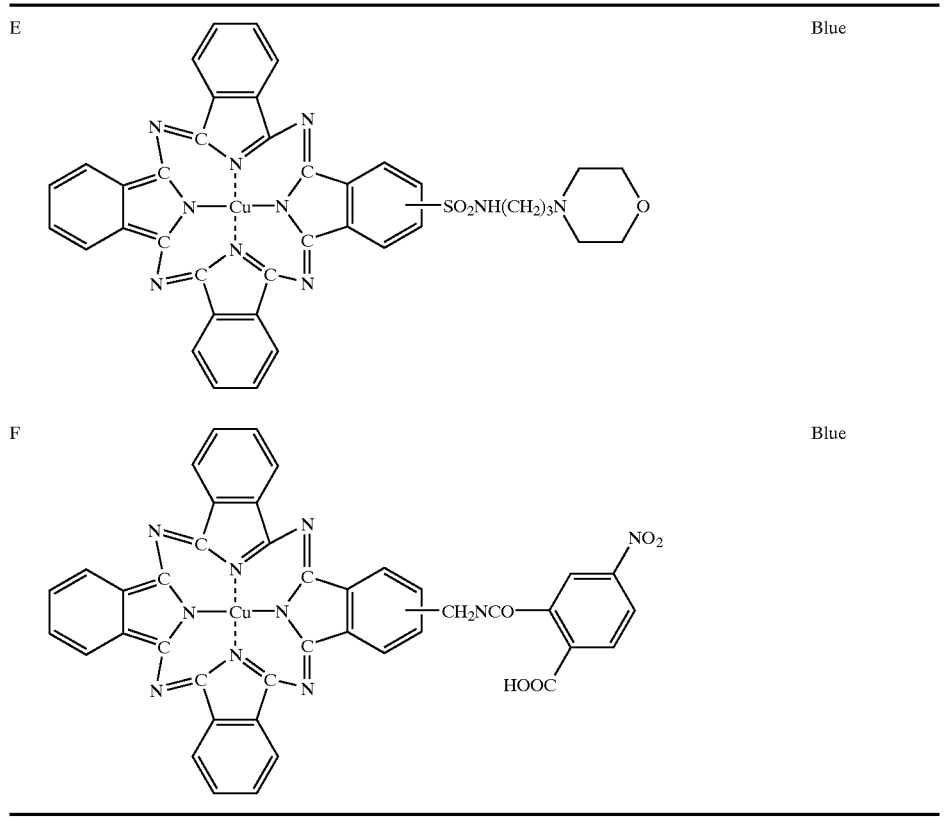 Blue
F Blue
TABLE 2
G 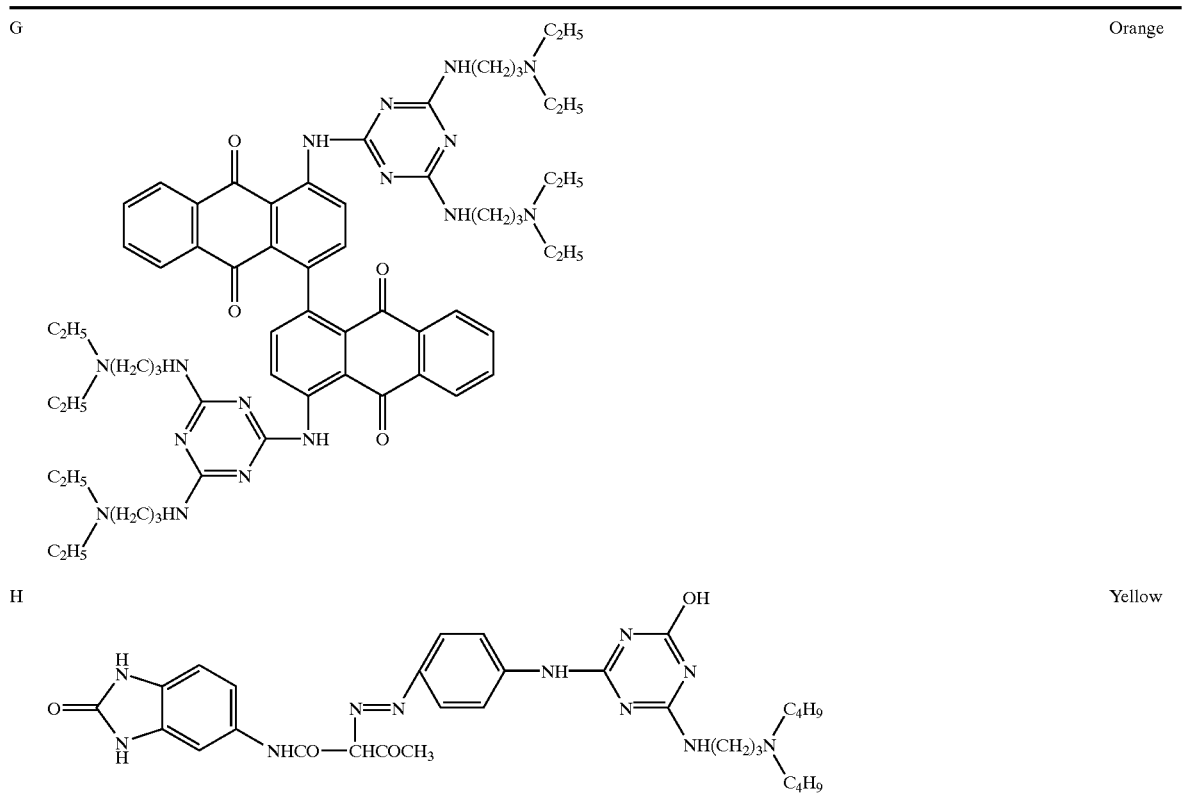 Orange
H Yellow

TABLE 2-continued
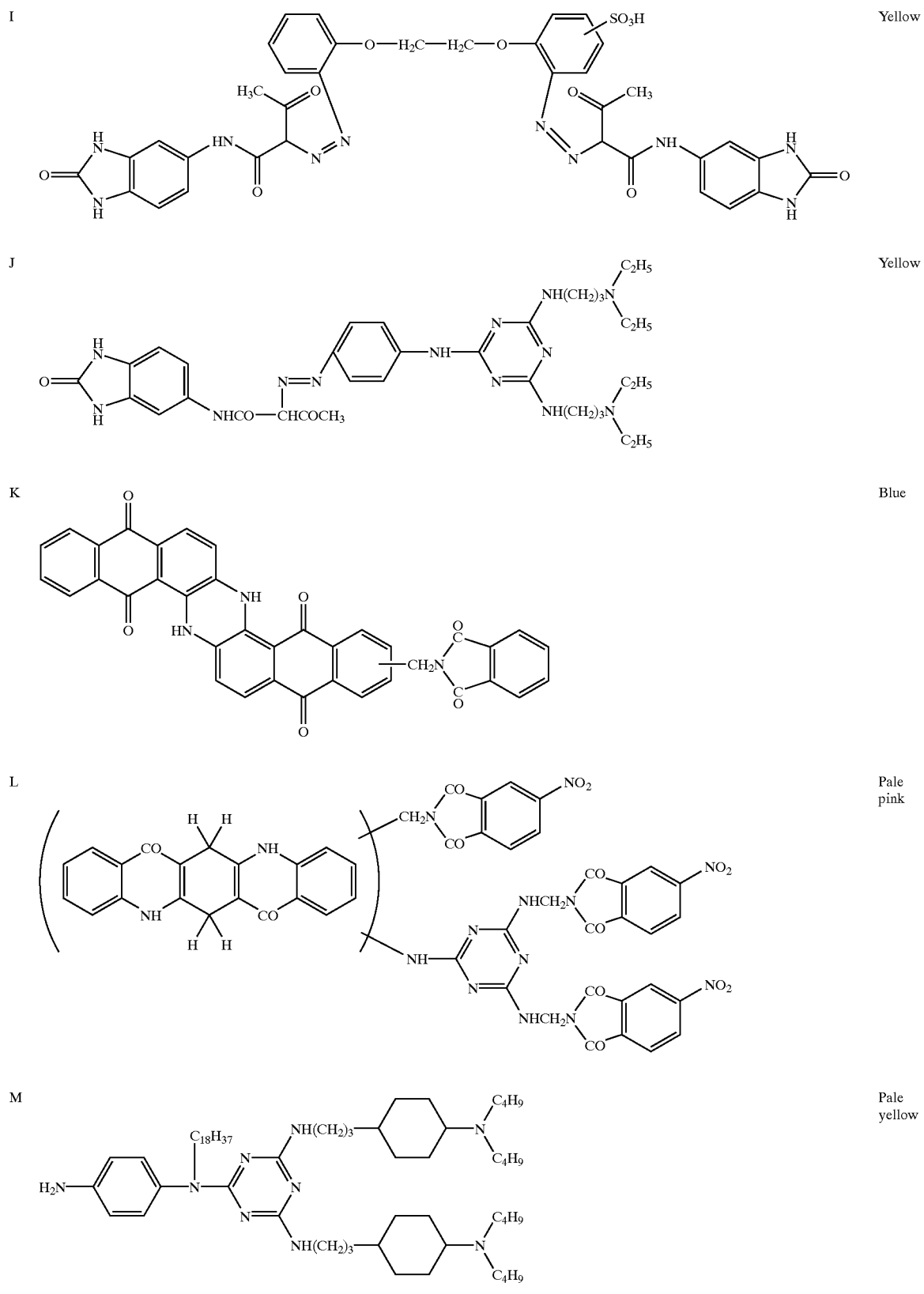

Example 1

3 L kneader was charged with the following components, and co-kneading in a wet condition was carried out at 80° C. for 4 hours:

- 140 parts of crude copper phthalocyanine (C.I. PIGMENT BLUE 15)
- 60 parts of crude benzimidazolone (C.I. PIGMENT YELLOW 120)
- 1200 parts of sodium chloride
- 200 parts of diethylene glycol Then, as a pigment derivative, 10 parts of copper phthalocyanine monosulfonic acid were added, and the mixture was further kneaded for 10 minutes to complete the co-kneading process.

The kneaded cake obtained was discharged, re-slurried in 10 L of water. After it was heated and agitated at 90° C. for 1 hour, it was filtered, washed, then, 205 parts of a green powder were obtained by drying at 90° C. for 12 hours and pulverizing (150 mesh).

Comparative Example 1a

3 L kneader was charged with 200 parts of crude copper phthalocyanine, 1200 parts of sodium chloride, and 200 parts of diethylene glycol, and kneading was carried out at 80° C. for 4 hours. After the kneading was completed, the kneaded mixture obtained was discharged, re-slurried in 10 L of water. After it was heated and agitated at 90° C. for 1 hour, it was filtrated and washed, and then 197 parts of a blue powder were obtained by drying it at 90° C. for 12 hours and pulverizing (150 mesh).

In the same manner, another 3L kneader was charged with 200 parts of crude benzimidazolone pigment, 1200 parts of sodium chloride, and 200 parts of diethylene glycol, and kneading was carried out at 80° C. for 4 hours. After the kneading was completed, the kneaded cake obtained was discharged, re-slurried in 10 L of water, after it was heated and agitated at 90° C. for 1 hour, filtrated and washed, and then 195 parts of a yellow powder were obtained by drying it at 90° C. for 12 hours and pulverizing (150 mesh).

200 parts of a pigment were obtained by mixing 140 parts of the blue pigment powder obtained above and 60 parts of the yellow pigment powder obtained above.

Comparative Example 1b

A green pigment was obtained by following the same processes as in Example 1 except that a pigment derivative was not used.

Example 1A 205 parts of a green pigment composition were obtained through the same processes as those of Example 1 except that for a pigment derivative Pigment Derivative (C) was used instead of copper phthalocyanine monosulfonic acid.

Example 1B 204 parts of a green pigment composition were obtained through the same processes as in Example 1 except that for a pigment derivative Pigment Derivative (D) was used instead of copper phthalocyanine monosulfonic acid.

Example 1C 204 parts of a green pigment composition were obtained through the same processes as in Example 1 except that for a pigment derivative Pigment Derivative (E) was used instead of copper phthalocyanine monosulfonic acid.

Example 2

The following were charged in a 3 L kneader, and co-kneading was carried out at 95° C. for 4 hours:

- 100 parts of crude copper phthalocyanine (C.I. PIGMENT BLUE 15)
- 100 parts of benzimidazolone pigment (C.I. PIGMENT YELLOW 151, "HOSTAPERM YELLOW H4G", made by Clariant)
- 1300 parts of sodium chloride
- 210 parts of diethylene glycol Then, 5 parts of a polymerized rosin whose softening point is 95° C. were added and kneading was further conducted for 5 minutes. Further, 5 parts of Pigment Derivative (A) were added, and kneading was conducted for 10 minutes to complete the co-kneading process.

The obtained kneading mixture was discharged, re-slurried in 10 L of water, and after it was heated and agitated at 90° C. for 1 hour, it was filtrated, washed, then, 204 parts of a green powder were obtained by drying at 90° C. for 12 hours and pulverizing (150 mesh).

Comparative Example 2

200 parts of crude copper phthalocyanine, 1300 parts of sodium chloride, and 210 parts of diethylene glycol, which were used in Example 2, were charged in a 3 L kneader, and kneading was carried out at 95° C. for 4 hours. Then, 5 parts of a polymerized rosin whose softening point is 95° C. were added, and kneading was further carried out for 5 minutes to complete the kneading process. The mixture was then discharged, re-slurried in 10 L of water, and after it was heated and agitated at 90° C. for 1 hour, filtrated and washed, and then 202 parts of a blue powder were obtained by drying it at 90° C. for 12 hours and pulverizing (150 mesh).

In the same manner, 200 parts of a benzimidazolone pigment, 1300 parts of sodium chloride, and 210 parts of diethylene glycol, which were used in Example 2, were charged in a 3 L kneader, and kneading was carried out at 95° C. for 4 hours. Then, 5 parts of a polymerized rosin whose softening point is 95° C. were added, and kneading was further conducted for 5 minutes to complete the kneading process. After the kneading was completed, the mixture was discharged, re-slurried in 10 L of water, and after it was heated and agitated at 90° C. for 1 hour, filtrated and washed, and then 200 parts of a yellow powder were obtained by drying it at 90° C. for 12 hours and pulverizing (150 mesh).

100 parts of the blue pigment powder and 100 parts of the yellow pigment powder were mixed to obtain a pigment having substantially the same composition as that obtained in Example 2 except for the absence of any pigment derivatives.

Example 3

The following were charged in a 3 L kneader, and co-kneading was carried out at 80° C. for 4 hours:

- 95 parts of crude copper phthalocyanine (C.I. PIGMENT BLUE 15)
- 105 parts of a benzimidazolone pigment (C.I. PIGMENT YELLOW 180, "Novoperm Yellow P-HG", made by Clariant)
- 1000 parts of sodium chloride
- 200 parts of diethylene glycol Then, 10 parts of Pigment Derivative (B) were added, and kneading was further carried out for 10 minutes to complete the co-kneading process.

The mixture was discharged, re-slurried in 10 L of water, and after it was heated and agitated at 90° C. for 1 hour, it was filtrated, washed, then, 206 parts of a green pigment composition were obtained by drying at 90° C. for 12 hours and pulverizing (150 mesh).

Comparative Example 3a 200 parts of crude copper phthalocyanine, 1000 parts of sodium chloride, and 200 parts of diethylene glycol, which were used in Example 3, were charged in a 3 L kneader, and kneading was carried out at 80° C. for 4 hours. After the kneading was completed, the mixture was discharged, re-slurried in 10 L of water, and after it was heated and agitated at 90° C. for 1 hour, filtrated and washed, and then 197 parts of a blue powder were obtained by drying it at 90° C. for 12 hours and pulverizing (150 mesh).

105 parts of a benzimidazolone pigment (C.I. PIGMENT YELLOW 180, "Novoperm Yellow P-HG", made by Clariant) were added to 95 parts of the blue powdery pigment obtained, and the two powders were mixed to obtain a pigment having the same composition as that in Example 3 except for the absence of pigment derivatives.

Comparative Example 3b 195 parts of a green pigment were obtained through the same processes as in Example 3 except that any pigment derivative was not added.

Comparative Example 3c

A pigment of substantially the same composition as that of Example 3 was obtained by adding 5 parts of Pigment Derivative (B) to 100 parts of the pigment obtained in Comparative Example 3a.

Comparative Example 3d

A pigment composition having the same composition as that of Example 3 was obtained by mixing the following:
- 95 parts of a copper phthalocyanine pigment (made by Toyo Ink Manufacturing, Co., Ltd., "LIONOL BLUE FG-7351")
- 105 parts of a benzimidazolone pigment (C.I. PIGMENT YELLOW 180, "Novoperm Yellow P-HG", made by Clariant, Co., Ltd.)
- 10 parts of Pigment Derivative (B)

Example 3A 206 parts of a green pigment composition were obtained through the same processes as in Example 3 except that Pigment Derivative (F) was used instead of Pigment Derivative (B).

Example 3B 204 parts of a green pigment composition were obtained through the same processes as in Example 3 except that Pigment Derivative (G) was used instead of Pigment Derivative (B).

Example 3C 205 parts of a green pigment composition were obtained through the same processes as in Example 3 except that Pigment Derivative (H) was used instead of Pigment Derivative (B).

Example 3D 205 parts of a green pigment composition were obtained through the same processes as in Example 3 except that Pigment Derivative (I) was used instead of Pigment Derivative (B).

Example 3E 195 parts of a green pigment composition were obtained through the same processes as in Example 3 except that Pigment Derivative (B) was not added. Then, 5 parts of Pigment Derivative (B) were added to 100 parts of the green pigment, and the powders were uniformly mixed each other so as to obtain a green pigment composition having substantially the same composition as that of Example 3.

Example 4

The following were charged in a 3L kneader, and co-kneading was carried out at 80° C. for 6 hours:
- 95 parts of crude copper phthalocyanine pigment (C.I. PIGMENT BLUE 15)
- 105 parts of a benzimidazolone pigment (C.I. PIGMENT YELLOW 180, "Novoperm Yellow P-HG", made by Clariant, Co., Ltd.)
- 1000 parts of sodium chloride
- 200 parts of diethylene glycol Then, 7 parts of Pigment Derivative (A) and 8 parts of Pigment Derivative (J) were added, and co-wetkneading was conducted for 5 minutes to complete the kneading process.

The obtained mixture was discharged, re-slurried in 10 L of water, and after it was heated and agitated at 90° C. for 1 hour, it was filtrated, washed, then, 208 parts of a green pigment composition were obtained by drying at 90° C. for 12 hours and pulverizing (150 mesh).

Example 5

The following were charged in a 3 L kneader, and co-kneading was carried out at 70° C. for 3 hours:
- 80 parts of an indanthrone blue pigment (C.I. PIGMENT BLUE 60, "MIKETHRENE BLUE-RSN", made by Sumitomo Chemical)
- 120 parts of crude isoindoline (C.I. PIGMENT YELLOW 139)
- 1400 parts of sodium chloride
- 250 parts of diethylene glycol Then, 3 parts of Pigment Derivative (K) were added, and kneading was further conducted for 5 minutes to complete the co-kneading process.

The obtained mixture was discharged, re-slurried in 10L of water, and after it was heated and agitated at 90° C. for 1 hour, it was filtrated, washed, then, 195 parts of a green powder were obtained by drying at 90° C. for 12 hours and pulverizing (150 mesh).

Comparative Example 5

190 parts of a green pigment were obtained by performing the same operations as in Example 5 except that no pigment derivative was added.

Example 6

The following were charged in a 1L attritor containing 2.3 kg of ⅜ inch φ steel balls, and dry-milling was carried out at 90° C. for 60 minutes:

80 parts of crude copper phthalocyanine 10 parts of crude monoazo (C.I. PIGMENT YELLOW 74)

10 parts of crude benzimidazolone (C.I. PIGMENT YELLOW 194)

Then, 5 parts of Pigment Derivative (M) were added, and dry-milling was further conducted for 5 minutes to obtain 100 parts of a green pigment composition.

Comparative Example 6

98 parts of a green pigment composition were obtained through the same processes as in Example 6 except that no pigment derivative was added.

Example 7

The following were charged in a 1L attritor containing 2.3 kg of ⅜ inch φ steel balls, and dry-milling was carried out at 100° C. for 60 minutes:

45 parts of crude copper phthalocyanine 45 parts of crude dimethylquinolinoquinolone 10 parts of a rosin-modified phenolic resin whose softening point is 160° C.

Then, 2 parts of Pigment Derivative (L) were added, and dry-milling was further conducted for 5 minutes to obtain 100 parts of a green pigment composition.

Comparative Example 7

In a 1 L attritor, 2.3 kg of ⅜ inch φ steel balls and 90 parts of a crude copper phthalocyanine were charged, and into it further added were 10 parts of a rosin-modified phenolic resin whose softening point is 160° C. The mixture was then dry-milled at 100° C. for 65 minutes:

Next, instead of the crude copper phthalocyanine 90 parts of a crude dimethylquinolinoquinolone was used to conduct the same dry-milling operation.

Two of the dry-milled pigments were then mixed at a mixing ratio of 50:50 by weight to obtain a milled product having the same composition as that in Example 7 except for the absence of pigment derivatives.

To 18 parts of a dry-milled pigment obtained in Example 7, 50 parts of a varnish for printing inks and 5 parts of No. 7 solvent (made by Nippon Oil Company) were added. After the mixture was agitated at 120° C. for 4 hours, it was milled at 60° C. three times by using a three-roll mill and the pigment was dispersed into 7.5 μ or less. Instead of the pigment of Example 7, the product of Comparative Example 7 was used, and the same procedures as above-described were conducted for obtaining the corresponding dispersion of 7.5 μ or less.

Each of the dispersions obtained above was used as a base ink to prepare the respective final ink products by further adding, to each of the base inks, 22 parts of a varnish and 11 parts of No. 7 solvent. Each was printed on an art paper by using a RI tester, and color shade and clearness were measured with a color difference meter. Color strength was measured with an optical densitometer. Gloss was measured using a digital bending glossimeter (made by Suga Test Instruments). The results are shown in Table 14.

TABLE 14

|  | Clearness Δ C* | Color strength (%) | Gloss (%) |
|---|---|---|---|
| Example 7 | 3.8 | 125 | 68 |
| Comparative Example 7 | — | 100 | 60 |

PRODUCTIONS AND EVALUATIONS OF DISPERSIONS OF PIGMENTS ACCORDING THE PRESENT INVENTION

The pigments prepared in Examples 1 to 6 and Comparative Examples 1 to 6 were processed into each dispersion of a paint, printing inks (gravure ink, offset ink, ink for printed circuit boards, and ink for ink-jet), resist ink for color filters and plastics, and evaluated.

Gravure Ink

Pigments

Examples 1 and 1A to 1C, Comparative Examples 1a and 1b 60 g of acrylics aqueous varnish, 20 g of water, 10 g of a pigment and 150 g of aluminum beads were charged in a mayonnaise bottle of 225 ml, vibrated in a paint conditioner for 1 hour, and an aqueous gravure ink was prepared.

The ink was drawn down on a K liner paper with a #4 bar coater, and the color shade and clearness were measured by a color difference meter. The gloss was measured by using a digital bending glossimeter (made by Suga Test Instruments). As for the stability of the obtained ink, the viscosity at the time of preparation of the ink was compared with one at the time when one week passed at 40° C. The conditions of the ink were studied and determined also by visual observation. The viscosity was measured at the rotating speed of 60 rpm, and at 25° C., by using a Brook Field rotation type viscometer. The results are shown in Table 3.

TABLE 3

|  | Clearness Δ C* | Color Strength (%) | Gloss (%) | Viscosity (cps) | | Stability |
|---|---|---|---|---|---|---|
|  |  |  |  | At the time of ink preparation | After passage of one week |  |
| Example 1 | 5.0 | 160 | 30 | 180 cps | 210 cps | Stable |
| Comparative Example 1a | — | 100 | 19 | 210 cps | 1680 cps | Yellow color separation, Viscosity thickening |
| Comparative Example 1b | 2.7 | 126 | 20 | 240 cps | 2040 cps | Viscosity thickening |
| Example 1A | 3.5 | 141 | 23 | 200 cps | 370 cps | Slightly thickening viscosity |

TABLE 3-continued

|  | Clearness Δ C* | Color Strength (%) | Gloss (%) | Viscosity (cps) | | Stability |
|---|---|---|---|---|---|---|
|  |  |  |  | At the time of ink preparation | After passage of one week |  |
| Example 1B | 6.8 | 172 | 32 | 140 cps | 160 cps | Stable |
| Example 1C | 3.0 | 138 | 22 | 200 cps | 475 cps | Slightly thickening viscosity |

Ink for Printed Circuit Board

Pigments

Example 2, Comparative Example 2

To 3 parts of a pigment, 106 parts of epoxy resin varnish, 10 parts of a hardening agent for epoxy resins, and 90 parts of precipitated barium sulfate were added. The mixture was then kneaded by a three-roll mill to prepare an ink composition for printed circuit board.

A commercially available green pigment C.I. PIGMENT GREEN 7 (LIONOL GREEN YS-07; made by Toyo Ink Mfg.) was processed into an ink, coated with a thickness of 25 μm on a film substrate, and thermally hardened to obtain a reference test piece. Each of the pigments obtained in Example 2 and Comparative Example 2 was also processed in the same way into the ink, to obtain respective test pieces.

The test pieces were evaluated by the measurements with a color measuring meter and densitometer. Transparency was determined by visual observation after the concentration was set at the same level as that of YS-07. For the stability, the condition of the ink was visually observed and at the time when 2 weeks passed at 25° C. after the preparation. The results are shown in Table 4.

TABLE 4

|  | Shade Δ H* | Color Strength (%) | Transparency | Stability |
|---|---|---|---|---|
| YS-07 |  | 100 | Standard | Pigment sedimentation |
| Example 2 | 0.7 | 165 | Slightly transparent | Good |
| Comparative Example 2 | 3.4 | 137 | Slightly opaque | Yellow color separation, Pigment sedimentation |

Paint

Pigments

Examples 1, 1A to 1C, 3, 3A to 3E, 4, and 6, Comparative Examples 1b, 3a to 3d, and 6.

First, a vehicle for paint was prepared as a mixture of 52 parts by weight of an alkyd resin varnish (whose nonvolatile part is 60%), 23 parts by weight of a melamine resin varnish (whose nonvolatile part is 50%), and 15 parts by weight of xylene.

To 10 g of each pigment, 90 g of the vehicle and 300 g of steel beads were added and mixed. The mixture was charged in a 225 ml mayonnaise bottle and dispersed for 1 hour by using a paint conditioner to prepare a paint composition.

The paint composition obtained was drawn down on a metal plate with a 6 mil applicator, and baked at 140° C. for 10 minutes.

Clearness and color strength of the paints from Examples were measured relative to those from Comparative Examples by using a color measuring meter. Also, viscosities at the time of paint preparation, at the time when one week passed at 40° C. and at the time when 3 weeks passed were compared. Further, an adjusted paint in which the prepared paint and xylene were mixed at the ratio of 1:2 was put into a test tube, and the stability of the paint placed in a rarefaction state and aged for one month at 25° C. was observed. Viscosities were measured at a rotating speed of 60 rpm and at 25° C. by using a Brook Field rotation type viscometer. The results are shown in Tables 5, 6 and 7.

TABLE 5

|  | Gloss (%) | Color Strength (%) | Viscosity (cps) | | | Dilution Stability |
|---|---|---|---|---|---|---|
|  |  |  | At the time of preparation | After passage of 1 week | After passage of 3 weeks |  |
| Example 1 | 70 | 160 | 360 | 446 | 522 | Stable |
| Comparative Example 1a | 60 | 100 | 458 | 766 | 1060 | Color separation |
| Comparative Example 1b | 65 | 126 | 570 | 1210 | 1880 | Slightly Color separated |
| Example 1A | 92 | 190 | 188 | 220 | 238 | Stable, Excellent Stability |

TABLE 5-continued

|  | Gloss (%) | Color Strength (%) | Viscosity (cps) | | | Dilution Stability |
|---|---|---|---|---|---|---|
|  |  |  | At the time of preparation | After passage of 1 week | After passage of 3 weeks |  |
| Example 1B | 78 | 176 | 306 | 366 | 418 | Stable |
| Example 1C | 85 | 183 | 200 | 245 | 320 | Stable |

TABLE 6

|  | Gloss (%) | Color Strength (%) | Viscosity (cps) | | | Dilution Stability |
|---|---|---|---|---|---|---|
|  |  |  | At the time of preparation | After passage of 1 week | After passage of 3 weeks |  |
| Example 3 | 78 | 182 | 240 | 320 | 4201 | Stable |
| Comparative Example 3a | 60 | 100 | 450 | 750 | 260 | Color separation |
| Comparative Example 3b | 65 | 105 | 670 | 1280 | 2010 | Slightly Color separated |
| Comparative Example 3c | 71 | 107 | 240 | 446 | 512 | Color separation |
| Comparative Example 3d | 69 | 105 | 240 | 398 | 460 | Color separation |
| Example 3A | 73 | 170 | 370 | 420 | 576 | Slightly Color separated |
| Example 3B | 70 | 172 | 326 | 400 | 488 | Slightly Color separated |
| Example 3C | 84 | 188 | 220 | 245 | 290 | Stable |
| Example 3D | 78 | 180 | 264 | 348 | 432 | Stable |
| Example 3E | 75 | 178 | 266 | 348 | 492 | Stable |
| Example 4 | 80 | 180 | 228 | 264 | 288 | Stable |

TABLE 7

|  | Gloss (%) | Color Strength (%) | Viscosity (cps) | | | Dilution Stability |
|---|---|---|---|---|---|---|
|  |  |  | At the time of preparation | After passage of 1 week | After passage of 3 weeks |  |
| Example 7 | 78 | 110 | 408 | 494 | 560 | Stable |
| Comparative Example 7 | 60 | 100 | 2600 | 3760 | 4250 | Color separation and sedimentation |

The paints shown and evaluated in Table 5 were printed on art papers with a 6-mil applicator, and baked at 125° C. for 15 minutes. To each of the samples prepared on an art paper, accelerated light resistance tests of 144 hours were carried out using a fadeometer.

The difference of color shade (ΔE) of the sample which has been exposed for 144 hours from the one which has not been exposed at all was measured with a color measuring meter. The changes are visually observed, also. The results are shown in Table 8.

TABLE 8

| | Change of Hue | |
|---|---|---|
| | Δ E | Visual observation |
| Example 1 | 1.2 | Excellent |
| Comparative Example 1a | 3.0 | Slightly changing of color |
| Comparative Example 1b | 4.7 | Changing of color |
| Example 1A | 1.8 | Excellent |

TABLE 8-continued

| | Change of Hue | |
|---|---|---|
| | Δ E | Visual observation |
| Example 1B | 2.2 | Excellent |
| Comparative Example 1c | 1.7 | Excellent |

Plastic Dispersion Pigments

Examples 1 and 1A to 1C, Comparative Examples 1a and 1b 0.1 parts by weight of a pigment, 100 parts by weight of polyvinyl acetate resin and 0.1 parts by weight of zinc stearate were mixed in a tumbler. The mixture was melt and extruded by an extruder, and after cooling, cut to prepare a pigment concentrate of plastic (coloring pellet).

The pigment concentrate (coloring pellet) was injection molded at 220° C. On a tinting color plate color-matched so that the ratio of the pigment to a white pigment (TiO$_2$) was 1:20, color strength and clearness were measured by using a color measuring meter. As a heat resistance test, color measuring in a full color plate and a tinting color plate formed by injection molding at 260° C. was carried out, both visually and with a color measuring meter (ΔE), while as a reference a full color plate and a tinting color plate obtained by injection molding at 220° C. were used. The results are shown in Table 9.

TABLE 9

|  | Clearness Δ C* | Color Strength (%) | Heat resistance | | |
|---|---|---|---|---|---|
|  |  |  | Full Shade Δ E | Tinting Shade Δ E | Visual observation |
| Example 1 | 4.5 | 120 | 1.5 | 1.0 | Excellent |
| Comparative Example 1a | — | 100 | 1.8 | 2.9 | Largely changing of color |
| Comparative Example 1b | 3.0 | 112 | 2.8 | 3.7 | Changing of Color |
| Example 1A | 4.2 | 125 | 1.8 | 2.0 | Slightly changing of color |
| Example 1B | 3.8 | 130 | 1.4 | 0.8 | Excellent |
| Example 1C | 3.9 | 124 | 1.6 | 1.0 | Excellent |

Offset Ink
Pigments

Examples 2 and 5, Comparative Examples 2 and 5

To 16 parts of a pigment, 54 parts of a rosin-modified phenolic resin varnish for printing ink and 15 parts of AF solvent No. 7 (made by Nippon Oil Company) were added. After the mixture was agitated gently at 50° C. for 1 hour, it was milled by a three-roll mill at 60° C. predetermined times to obtain a base ink in which pigment particles were dispersed with the sizes of 7.5 μm or less. To the obtained base ink, 22 parts of varnish and 12 parts of AF solvent No. 7 were added, and adjusted into a final ink product.

The prepared ink was drawn down on an art paper using a RI tester, and each of the following measurements was conducted: Color shade and clearness were measured with a color measuring meter, color strength with a densitometer, and gloss with a digital multiangle glossimeter (Suga Test Instruments). The results are shown in Tables 10 and 11.

TABLE 10

|  | Clearness Δ C* | Color Strength (%) | Gloss (%) | Transparency |
|---|---|---|---|---|
| Example 2 | 4.6 | 195 | 68 | Transparent |
| Comparative Example 2 | — | 100 | 65 | Standard |

TABLE 11

|  | Clearness Δ C* | Color Strength (%) | Gloss (%) | Transparency |
|---|---|---|---|---|
| Example 5 | 3.0 | 115 | 72 | Transparent |
| Comparative Example 5 | — | 100 | 60 | Standard |

Resist Ink for Color Filter
Pigments

Examples 3 and 3D, Comparative Examples 3a and 3b

The following were uniformly agitated and mixed:
4.5 parts of a pigment
24.0 parts of acrylic resin varnish
5.4 parts of trimethyrol propane triacrylate ("NK ESTER ATMPT" made by Shin-Nakamura Chemical)
0.3 parts of a photoinitiator ("Ilgercure 907" made by Chiba-Geigy)
0.2 parts of a sensitizer ("EAB-F" made by Hodogaya Kagaku)
65.1 parts of cyclohexanone The mixture was filtrated through a filter in thickness of 1 μm to prepare a composition of an alkali development-type photosensitive coloring material.

The photosensitive coloring composition obtained was coated with a spin coater to form a film, and the film was then exposed to ultraviolet rays to make a colorant layer on a transparent substrate. The surface condition was visually observed. The substrate with a colorant layer was then immersed in N-methylpyrolidone (NMP) for 30 minutes and after drying it, chromaticity measurements were conducted with a microscope spectrophotometer. NMP resistance was evaluated by the color difference ΔE before and after the immersion. The results are shown in Table 12.

TABLE 12

|  | Particle diameter (nm) | Maximum Transmittance | Surface Condition | NMP resistance Δ E |
|---|---|---|---|---|
| Example 3 | 30 to 50 | 78% | Excellent | 1.3 |
| Example 3D | 20 to 50 | 81% | Excellent | 1.2 |
| Comparative Example 3a | 80 to 120 | 50% | Rough | 3.0 |
| Comparative Example 3b | 60 to 100 | 59% | Rough | 3.3 |

Dispersion for Ink-Jet Printing
Pigments

Examples 3 and 3D, Comparative Examples 3a and 3b

The following were mixed first:
8.0 parts of a pigment
3.8 parts of aqueous solution of an acrylic resin ("Johncryl 62", made by Johnson Polymer)
3.0 parts of an activating agent ("Emergen A-60", made by Kao Corp.)
74.5 parts of purified water
6.0 parts of ethylene glycol The mixture was then dispersed in a sand mill for 4 hours to obtain a base ink. Further, the following components were mixed and filtrated by a membrane filter of 0.5 μ to obtain an ink-jet printing ink.

13.9 parts of base ink 2.1 parts of acrylic resin emulsion ("W-215", made by Nihon Polymer)

24.0 parts of glycerin 63.5 parts of purified water 0.1 parts of 2,4,7,9-tetramethyl-5-decin-4,7-diol Transparency obtained when the ink was drawn down on an OHP sheet for ink-jet printing use with a 1.5-mil applicator was determined by visual observation. For photoresistance, the ink was drawn down on a normal paper with a 4-mil applicator, and accelerated light resistance tests with an exposure period of 100 hours were carried out using a fadeometer. The difference of hue (ΔE) of the sample which has been exposed for 100 hours from the one which has not been exposed at all was measured with a color difference meter. The change of appearance was visually observed, also. Ink stability was evaluated by the condition of the ink that has been kept in a thermostat at 40° C. for one month. The results are shown in Table 13.

TABLE 13

| | Particle Diameter (nm) | Transparency | Light Resistance | Stability |
|---|---|---|---|---|
| Example 3 | 30 to 50 | Excellent | 1.5 | Excellent |
| Example 3D | 20 to 50 | Excellent | 1.0 | Excellent |
| Comparative Example 3a | 80 to 120 | Opaque | 2.2 | Poor: separation and sedimentation |
| Comparative Example 3b | 60 to 100 | Opaque | 1.9 | Poor: sedimentation |

It will also be appreciated that, although a limited number embodiments of the invention have been described in detail for purposes of illustration, various modifications may be made without departing from the spirit and scope of the invention. Accordingly, the invention should not be limited except as by the appended claims.

What is claimed is:

1. A green pigment composition comprising (a) a green pigment consisting essentially of a mixture of fine particles of a halogen-free blue pigment and fine particles of a halogen-free yellow pigment and (b) a halogen-free pigment derivative, wherein the pigment derivative is in an amount of 0.2–30 wt. % based on an amount of the green pigment, the blue pigment is at least one selected from the group consisting of phthalocyanine pigments, threne pigments, and indigo pigments, the yellow pigment is at least one selected from the group consisting of azo, benzimidazolone, isoindoline, flavanthrone, anthrapyrimidine, anthraquinone, quinolinoquinolone, fluoroflavin and fluoruvin pigments, and the pigment derivative has a colorant residue and/or triazine group.

2. The green pigment composition as claimed in claim 1, wherein said green pigment is a product obtained from a co-fining process of the halogen-free blue pigment and the halogen-free yellow pigment.

3. The green pigment composition as claimed in claim 1, wherein said green pigment is a product obtained by co-wetgrinding the halogen-free blue pigment and the halogen-free yellow pigment.

4. The green pigment composition as claimed in claim 1, wherein said green pigment is a product obtained by co-drymilling the halogen-free blue pigment and the halogen-free yellow pigment.

5. The pigment composition as claimed in claim 1, wherein said pigment derivative comprises a compound as shown by the following general formula (1) or (2):

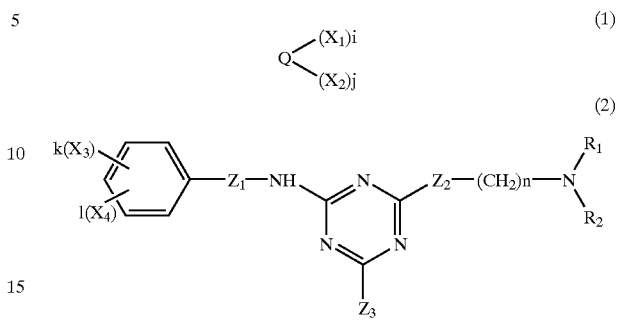

wherein Q represents an organic pigment residue that does not contain a halogen atom, i and j independently represent an integer of 1 to 4, $X_1$ and $X_2$ are different from each other and are a hydrogen atom or a substituent indicated as follows:

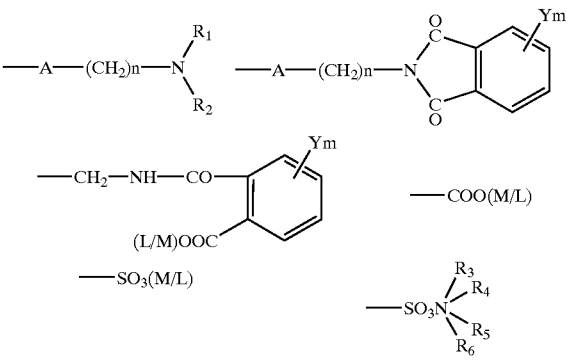

wherein $R_1$, $R_2$ represent a hydrogen atom, an alkyl group having 1 to 4 carbon atoms, respectively and independently, or, $R_1$ and $R_2$ together may constitute a 5 or 6 membered ring structure which may further contain N, O or S atom, $R_3$, $R_4$, $R_5$ and $R_6$ are a hydrogen atom, or an alkyl group having 1 to 30 carbon atoms, and all of $R_3$, $R_4$, $R_5$ and $R_6$ are not to be hydrogen atoms, and further wherein Y represents a hydrogen atom, —$NO_2$, —$NH_2$ or —$SO_3H$, M represents a hydrogen atom or divalent or trivalent metal atom, m represents an integer of 0 to 4, L represents valence number of M, and n represents an integer of 1 to 8, and furthermore wherein A represents direct bonding, —O—, —S—, —CO—, —$SO_2$—, —$CH_2NHCOCH_2$—, —$CR_7R_8$—, —$SO_2NR_7$—, —$CH_2NHCO$—, —$CH_2NCONR_7$— ($R_7$ is an hydrogen atom, an alkyl group having 1 to 30 carbon atoms or an aryl group, $R_8$ represents an alkyl having 1 to 30 carbon atoms or an aryl group), or a divalent linkage group indicated by the following formula:

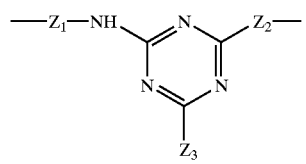

wherein $Z_1$ represents direct bonding, —CONH—$R_9$—, —$SO_2NH$—$R_9$—, or —$CH_2NHCOCH_2$—$R_9$— in which $R_9$ represents an alkylene group having 1 to 8 carbon atoms or an arylene group, $Z_2$ represents —NH— or —O—, $Z_3$ represents a hydroxide group, an alkoxy group or a substituent indicated by the following general formula:

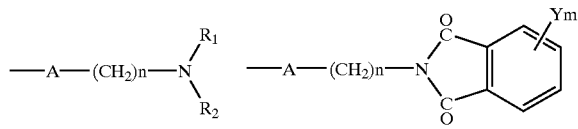

wherein each or $R_1$, $R_2$, $Z_2$ n and Ym is as already described above, and in the case where i represents 1, $Z_3$ may represent —NH—$Z_1$—Q, and further wherein $X_3$ represents an amino group, $X_4$ represents a hydrogen atom, an amino group, a nitro group, a hydroxide group, an alkoxy group, a carboxyl group, a sulfonic group, an alkyl group which may be substituted or not be substituted, or an alkenyl group which may be substituted or not be substituted, and k represents an integer of 1 to 3, 1 represents an integer of 0 to 2.

6. The green pigment composition as claimed in claim 1, wherein the particles of the blue pigment, the particles of the yellow pigment and the pigment derivative are in a state of homogeneous mixture in their particle size order.

7. The pigment composition as claimed in claim 1, wherein average particle sizes of primary particles constituting the blue pigment and the yellow pigment are both 0.1 micron or less.

8. The green pigment composition as claimed in claim 1, wherein the ratio of the halogen-free blue pigment to the halogen-free yellow pigment is within the range from 9:1 to 1:9.

9. A pigment dispersion comprising the green pigment composition as claimed in claim 1 and a vehicle component.

* * * * *